United States Patent [19]

Peter et al.

[11] 4,108,689

[45] Aug. 22, 1978

[54] PROCESS FOR IMPROVING THE SURFACES OF ROLLER BODIES AND BALLS

[75] Inventors: Wolfgang Peter, Hegnach; Heinz Koch, Fellbach; Alfred Stubenvoll, Stuttgart, all of Fed. Rep. of Germany

[73] Assignee: Daimler-Benz Aktiengesellschaft, Fed. Rep. of Germany

[21] Appl. No.: 732,352

[22] Filed: Oct. 14, 1976

Related U.S. Application Data

[63] Continuation of Ser. No. 475,984, Jun. 3, 1974, abandoned.

[30] Foreign Application Priority Data

Jun. 9, 1973 [DE] Fed. Rep. of Germany ....... 2329576

[51] Int. Cl.² .............................................. C23F 7/10
[52] U.S. Cl. ......................... 148/6.15 R; 148/6.15 Z; 308/241; 427/290; 427/327; 427/334; 427/417
[58] Field of Search ............... 427/290, 327, 417, 334; 308/241; 148/6.15 R, 6.15 Z

[56] References Cited

U.S. PATENT DOCUMENTS

| 2,217,586 | 10/1940 | Zapf ................... | 148/6.15 R |
| 3,507,677 | 4/1970 | Maynard ............ | 148/6.15 R |
| 3,515,599 | 6/1970 | Connelly ............ | 148/6.15 R |
| 3,562,023 | 2/1971 | Courier .............. | 148/6.15 R |
| 3,664,886 | 5/1972 | Pederson ........... | 148/6.15 R |

OTHER PUBLICATIONS

German Industrial Standard (DIN 50 938), Dec. 1973.

*Primary Examiner*—Ronald H. Smith
*Assistant Examiner*—John D. Smith
*Attorney, Agent, or Firm*—Craig & Antonelli

[57] ABSTRACT

The surfaces of antifriction elements and other steel surfaces in mutual sliding contact are improved by first degreasing the surfaces in a mild alkaline aqueous degreasing bath at a pH of about 7 to 10, by then rinsing with cold water, by browning the surfaces in a saturated aqueous solution of a selected salt material at temperatures of from 128° to 135° C.

11 Claims, No Drawings

PROCESS FOR IMPROVING THE SURFACES OF ROLLER BODIES AND BALLS

CROSS-REFERENCE TO RELATED APPLICATION

This application is a continuation of application Ser. No. 475,984 filed June 3, 1974, and now abandoned.

This invention relates to a process for improving the surfaces of antifriction elements or balls and/or working surfaces of homokinetic joints and/or antifriction bearings or other steel surfaces being in mutual sliding contact, which surfaces have already been treated, for obtaining minor peak-to-valley height, by grinding, lapping, polishing, or similar treatments.

In automotive vehicles, joints of the above type are preferably utilized. Due to the kinematic relationships, the ball bearings employed therein as force-transmitting elements execute, under load, a rolling motion as well as a sliding motion. This leads increasingly to pitting on the ball bearings and/or the joint working surfaces. The reason for this is to be seen in the increased shearing stress of the surfaces.

Already from this viewpoint, it is essential to provide minimum friction coefficients in this pairing of surfaces of the ball and the working surface of the joint. For such a joint becomes inoperative normally due to synchronizing flaws and thus due to oscillations emanating from worn or pitted working surfaces and/or balls. This even leads, under certain conditions, to ball breakage, which is especially grave, since the affected vehicle wil then come to a standstill.

It has been suggested to substantially improve the balls and/or working surfaces of such joints with respect to their sliding ability by browning these components. This satisfactory result was the more surprising inasmuch as the browning process per se has been conventional, but has been used heretofore only in entirely different technical fields, e.g. in weapon construction. This was done, furthermore, for entirely different purposes, namely merely as a corrosion protection or, above all, for the reason of imparting a more attractive appearance to the respective parts, for example the barrels and bolts of rifles or pistols. At the same time, the browning process was conducted for the purpose of giving the surfaces of these parts a matte finish to avoid a reflecting effect.

However, it has now been found that, in the special case of the application of this process as described above, specific process conditions should be observed as well, if the desired effect is really to be attained, namely particularly the reduction of the friction coefficient and a decrease in wear and tear of the components. For it can happen, due to deviations in the bath temperatures and in the concentration or bath composition used in this process that the surfaces are even impaired, as compared to untreated surfaces.

It is of decisive importance not to destroy the smooth, polished or lapped initial surfaces exhibited by the above-mentioned balls or antifriction elements. This would occur, if the bath temperatures and, since saturated solutions are involved, the bath concentrations are selected to be too high. The same is also the case when the composition of the bath is too aggressive. As a consequence, the smooth surfaces are etched at some locations, but in particular intergranular etchings occur, having an extremely deleterious effect on the durability of the surfaces during shear stress, but also affect the wear and tear behavior negatively. Especially in conventional two-bath or multi-bath browning processes, the baths following the first bath are operated, for obtaining especially dense and thick layers, with a temperature level which is stepwise elevated. This is impracticable and furthermore expensive. For the same reasons, the known bonderizing processes are also inferior to the browning method in the aforementioned cases of application. The known browning process (also referred to as burnishing) is disclosed more fully in the proposed draft of the German Norms "DIN 50938" of September 1971. Basically the browning process can be employed with all normal structural steels of the unalloyed or low-alloyed types for corrosion protection or for improving the appearance. The type of steel utilized and tested by the present invention is known as "ball and roller bearing steel" (German designation 100Cr6). This steel is used worldwide in the same or similar composition.

The invention proposes a process wherein the antifriction elements and/or balls of said ball and roller bearing steel are first degreased in a mildly alkaline, aqueous degrasing bath (pH about 7-10) and are then rinsed with cold tap water; they are then browned for about 15 minutes at about 128° to about 135° C. in a saturated aqueous solution of a salt material having approximately the following composition:

80 - 90% by weight of sodium hydroxide (NaOH)
5 - 15% by weight of sodium nitrite ($NaNO_2$)
3 - 10% by weight of sodium phosphate, dibasic ($Na_2HPO_4$);

and the element and/or balls are subsequently again rinsed with cold tap water.

With the use of the present invention, excellent sliding properties can be obtained between the balls and the rolling surfaces, as well as improved wear and tear properties, especially in case of homokinetic joints. The process can also be applied to other pairs of frictional elements subjected to a similar pretreatment, thus, for example, to antifriction members in bearings, gear-pair sets, cam drives, etc. In all of these instances, the friction coefficient is considerably reduced.

In this invention, a bath composition is preferred which is prepared from a salt material or mineral mixture having approximately the following composition:

85% by weight of sodium hydroxide (NaOH)
10% by weight of sodium nitrite ($NaNO_2$), and
5% by weight of sodium phosphate, dibasic ($Na_2HPO_4$).

In this connection, such a concentration of the browning bath is to be set that the boiling temperature of the bath is at 135° C. (approximately 600 g. of salt per 1 liter of water). It is also possible to make the bath even gentler, thus obtaining equally satisfactory or perhaps even better results, namely when the boiling temperature is 128° C.

Finally, it is also possible to have the last rinsing bath followed by a mineral oil dip bath at about 100° - 130° C. This produces a corrosion-protective film for transportation and storage.

The improvements obtained by the present invention in connection with the ball and roller bearing steel have been examined. According to these tests, the average lifetime of untreated ball bearings was about 30 hours. By the treatment process according to the invention, this lifetime can be increased to about 60 hours. These experiments were conducted under rigorous conditions.

The coefficient of friction of untreated balls was, according to our findings, 0.07 on the average. By the treatment of this invention, the friction coefficient is improved to about 0.045 - 0.05.

The duration of the bath treatment can be from 15 to 20 minutes. According to our experiments, the most advantageous time period is 15 minutes or in the proximity thereof. If the duration of the treatment is reduced, poorer values are very quickly obtained. Thus, a treatment time of, for example, only 10 minutes clearly proved insufficient.

While the novel principles of the invention have been described, it will be understood that various omissions, modifications and changes in these principles may be made by one skilled in the art without departing from the spirit and scope of the invention.

What is claimed is:

1. A process for improving steel surfaces in mutual sliding contact, that have already been treated to obtain minor peak-to-valley height which comprises the steps of degreasing the steel surfaces in a mildly alkaline, aqueous degreasing bath at a pH of about 7 to 10; rinsing the degreased surfaces with cold tap water; browning the surfaces for about 15 to 20 minutes at approximately 128° to 135° C. in a single bath of a saturated aqueous solution of a salt material having approximately the following composition:
   80-90% by weight of sodium hydroxide (NaOH)
   5-15% by weight of sodium nitrite ($NaNO_2$), and
   3-10% by weight of sodium phosphate, dibasic ($Na_2HPO_4$); and rinsing the surfaces subsequently again with cold tap water.

2. The process according to claim 1, in which browning is effected for about 15 minutes.

3. The process according to claim 1, in which the salt material forming the browning bath has the following composition:
   85% sodium hydroxide (NaOH)
   10% sodium nitrite ($NaNO_2$), and
   5% sodium phosphate, dibasic ($Na_2HPO_4$).

4. The process according to claim 1, in which the salt material in the browning bath has such a concentration of salt that its boiling temperature is 135° C.

5. The process according to claim 4, in which the concentration of the salt material is about 600 grams per liter of water.

6. The process according to claim 1, in which the last rinsing is furthermore followed by a mineral oil dip bath at about 100°–130° C.

7. The process according to claim 1, in which the temperature of the aqueous solution is at the boiling temperature of said solution.

8. The process according to claim 1, in which said steps are effected successively one after the other.

9. The process according to claim 1, in which said steel surfaces are treated to obtain minor peak-to-valley height by grinding, lapping, polishing or similar abrading treatments.

10. A process for improving the steel surfaces of elements in mutual sliding contact which surfaces have been treated to obtain minor peak-to-valley height, which consists of:
    (1) degreasing the steel surfaces in a mildly alkaline, aqueous degreasing bath at a pH of about 7 to 10;
    (2) rinsing the degreased surfaces with cold tap water;
    (3) browning the surfaces for about 15 to 20 minutes at approximately 128° to 135° C. in a single bath of a saturated aqueous solution of a salt material having approximately the following composition:
       80-90% by weight of sodium hydroxide (NaOH)
       5-15% by weight of sodium nitrite ($NaNO_2$), and
       3-10% by weight of sodium phosphate, dibasic ($Na_2HPO_4$); and
    (4) rinsing the surfaces again with cold tap water.

11. A process for improving the steel surfaces of elements in mutual sliding contact which surfaces have been treated to obtain minor peak-to-valley height which consists of:
    (1) degreasing the steel surfaces in a mildly alkaline, aqueous degreasing bath at a pH of about 7 to 10;
    (2) rinsing the degreased surfaces with cold tap water;
    (3) browning the surfaces for about 15 to 20 minutes at approximately 128° to 135° C. in a single bath of a saturated aqueous solution of a salt material having approximately the following composition:
       80-90% by weight of sodium hydroxide (NaOH)
       5-15% by weight of sodium nitrite ($NaNO_2$), and
       3-10% by weight of sodium phosphate, dibasic ($Na_2HPO_4$);
    (4) rinsing the surfaces again with cold tap water, and
    (5) treating the again rinsed surfaces in a mineral oil dip bath at about 100°–130° C.

* * * * *